United States Patent
Kunimochi (10) Patent No.: US 7,246,933 B2
(45) Date of Patent: Jul. 24, 2007

(54) SPREAD ILLUMINATING APPARATUS

(75) Inventor: Toru Kunimochi, Iwata-gun (JP)

(73) Assignee: Minebea Co., Ltd, Nagano (JP)

( * ) Notice: Subject to any disclaimer, the term of this patent is extended or adjusted under 35 U.S.C. 154(b) by 90 days.

(21) Appl. No.: 11/074,700

(22) Filed: Mar. 9, 2005

(65) Prior Publication Data

US 2005/0243575 A1 Nov. 3, 2005

(30) Foreign Application Priority Data

Apr. 30, 2004 (JP) ............................ 2004-135915

(51) Int. Cl.
*F21V 7/04* (2006.01)
(52) U.S. Cl. ...................................... 362/620
(58) Field of Classification Search ................. 362/620
See application file for complete search history.

(56) References Cited

U.S. PATENT DOCUMENTS

| | | | |
|---|---|---|---|
| 6,576,887 B2 * | 6/2003 | Whitney et al. | 250/227.11 |
| 6,628,460 B1 * | 9/2003 | Ookawa et al. | 359/455 |
| 6,692,133 B2 * | 2/2004 | Katsu et al. | 362/620 |
| 6,827,458 B2 * | 12/2004 | Suga | 362/609 |
| 7,052,168 B2 * | 5/2006 | Epstein et al. | 362/619 |
| 2004/0120139 A1 | 6/2004 | Kunimochi et al. | |

FOREIGN PATENT DOCUMENTS

| | | |
|---|---|---|
| JP | A 10-253960 | 9/1998 |
| JP | A 2004-6326 | 1/2004 |
| JP | A 2004-200072 | 7/2004 |

* cited by examiner

*Primary Examiner*—Ali Alavi
*Assistant Examiner*—William J. Carter
(74) *Attorney, Agent, or Firm*—Oliff & Berridge, PLC (57) ABSTRACT

A side light type spread illuminating apparatus comprises: a light conductive plate having a plurality of prisms formed on a light exit surface thereof, point light sources; and a prism sheet disposed on the light conductive plate, wherein the prisms have respective circular arc configurations with a common curvature in cross section taken along a line orthogonal to the direction the prisms extend, and are arrayed such that distances each defined between apexes of adjacent two of the prisms differ irregularly from one another within a range of 10 to 200 μm, and such that overall tangential angles at respective ends of the prisms vary irregularly within a range of 40 to 70 degrees, and wherein the respective ridges of the prisms are located on a common virtual plane, whereby the prism sheet are supported evenly by all of the prisms of the light conductive plate.

11 Claims, 9 Drawing Sheets

SPREAD ILLUMINATING APPARATUS

BACKGROUND OF THE INVENTION

1. Field of the Invention

The present invention relates to a spread illuminating apparatus as a lighting means for a liquid crystal display apparatus, and more specifically to a side light type illuminating apparatus using a point light source.

2. Description of the Related Art

Recently, a liquid crystal display (hereinafter referred to as "LCD" as appropriate) apparatus is extensively used as a display device for electronic equipments, such as personal computers, cellular phones, and the like. Since the liquid crystal, unlike a cathode ray tube, does not emit light by itself, a transmission type LCD apparatus requires a lighting means for illuminating its liquid crystal panel, and also a semi-transmission type LCD apparatus which utilizes outside light must have an auxiliary lighting means for enabling a usage in the dark. A side light type illuminating apparatus mainly comprises a light conductive plate and a light source disposed at a side surface of the light conductive plate, readily enables its profile to be lowered, and therefore can be suitably used as a lighting means for the LCD apparatus, for which a cold cathode tube, that is a line light source, is conventionally used.

Figure 12:
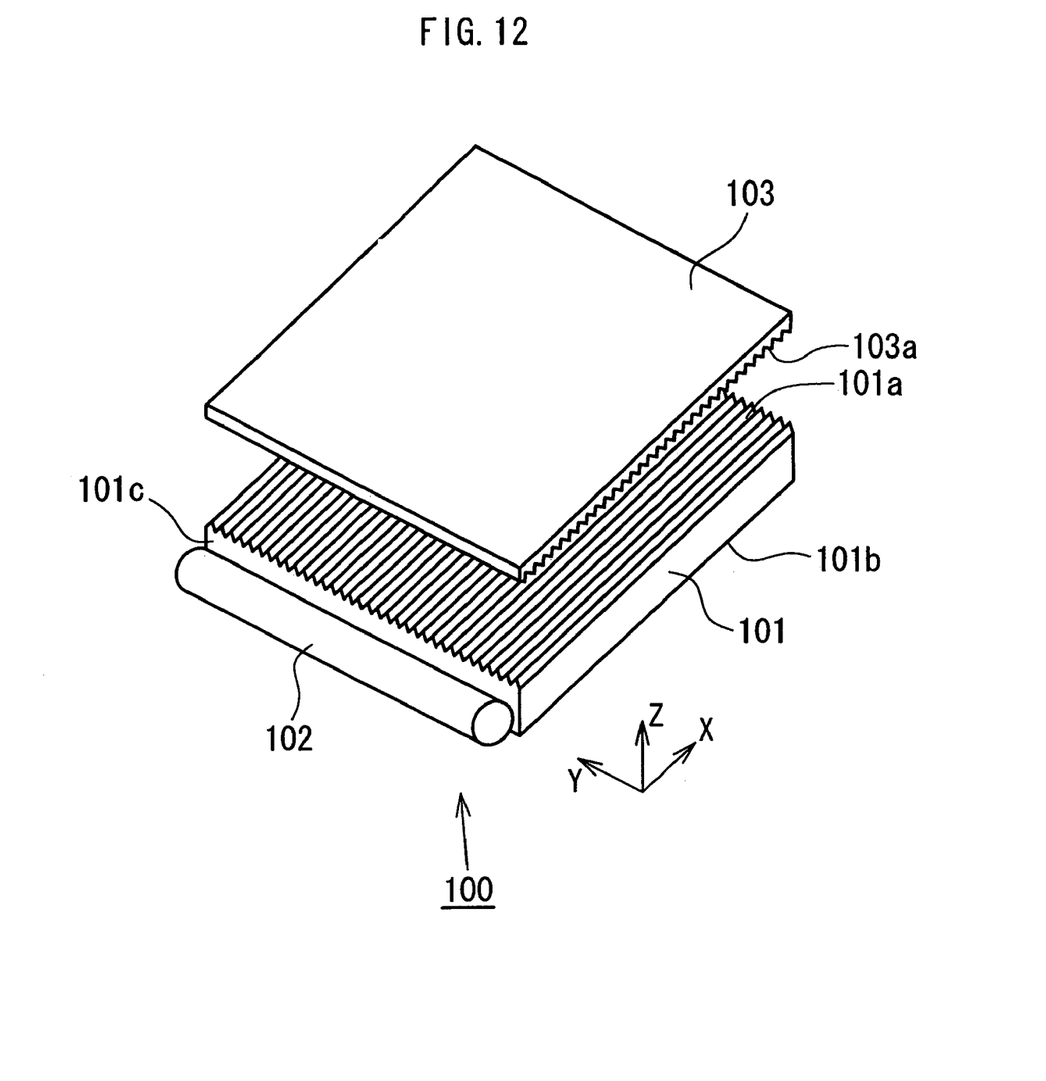
FIG. 12 is an exploded perspective view of a main portion of a conventional spread illuminating apparatus.

Conventionally, in such a spread illuminating apparatus, outgoing light is converged within the viewing angle of a liquid crystal panel, or the like as an object to be illuminated, thereby enhancing brightness within the viewing angle (front brightness), which is practically important (refer to, for example, Japanese Patent Application Laid-Open No. H10-253960). FIG. 12 is an exploded perspective view of a conventional side light type spread illuminating apparatus 100 having such a light converging means as described above. The spread illuminating apparatus 100 comprises a light conductive plate 101 defining a light entrance surface 101c, a light reflection surface 101b and a light exit surface 101a, a line light source 102 disposed at the light entrance surface 101c of the light conductive plate 101, and a prism sheet 103 disposed on the light exit surface 101a of the light conductive plate 101.

The light conductive plate 101 is formed of a transparent resin material, such as methacrylate resin, polycarbonate resin, and the like. On the light exit surface 101a which is one major surface of the light conductive plate 101, a plurality of triangular prisms are formed which are shaped identical with one another, extend in a direction orthogonal to the light entrance surface 101c, and which are arrayed at a regular interval. On the light reflection surface 101b which is the other major surface of the light conductive plate 101 opposite to the light exit surface 101a, a diffuse or regular reflecting means (not shown) is provided which reflects light toward the light exit surface 101a so that the light impinges on the light exit surface 101a at an angle less than an critical angle. The prism sheet 103 is formed of a transparent resin material, for example a PET film, and has, on a major surface (prism surface) 103a thereof, a plurality of triangular prisms which are formed of a transparent resin material, such as methacrylate resin, polycarbonate resin, and the like, and which extend in one same direction. The prism sheet 103 is disposed on the light conductive plate 101 such that the prism surface 103a faces the light exit surface 101a with their respective triangular prisms extending orthogonally to each other.

In the following discussion, a direction orthogonal to the light entrance surface 101c of the light conductive plate 101 is defined as an X-axis direction, a direction normal to the light exit surface 101a of the light conductive plate 101 is defined as a Z-axis direction, and a direction perpendicular to both the X-axis and Z-axis directions is defined as a Y-axis direction. Also, planes defined by the coordinate axes (X, Y, Z) shown in FIG. 12 are referred to as an XY plane, a YZ plane, and an XZ plane, which will be used also for any planes parallel thereto.

In the spread illuminating apparatus 100, light emitted from the line light source 102 is introduced into the light conductive plate 101 through the light entrance surface 101c thereof, then partly exits out from the light exit surface 101a while traveling inside the light conductive plate 101 with repeated reflections at the light reflection surface 101b and the light exit surface 101a, and finally illuminates a liquid crystal panel, or the like as an object illuminated. When the light exits out from the light exit surface 101a, the YZ plane directivity of the light is compensated with respect to the XZ plane by means of the triangular prisms formed on the light exit surface 101a, and then the XZ plane directivity of the light is compensated with respect to the YZ plane by means of the triangular prisms formed on the prism surface 103a of the prism sheet 103, whereby brightness for the Z-axis direction neighborhood, which is the front brightness, is enhanced. This arrangement is advantageous compared with an arrangement in which two prism sheets are disposed on a light exit surface of a light conductive plate with their respective prisms extending orthogonally to each other such that their respective plain surfaces opposite to the prism surfaces face toward the light exit surface of the light conductive plate, in that the number of expensive prism sheets is reduced, and in that light exiting out the light conductive plate is not reflected at the plane surfaces of the prism sheets so as to go back to the light conductive plate. It is known that if the light reflection surface 101b is provided with a regular reflecting means comprising, for example, V-shaped grooves extending in the Y-axis direction so that light reflected by such a reflecting means falls incident on the light exit surface 101a at an angle slightly smaller than a critical angle, then the light exits out from the light exit surface 101a with a narrow directivity inclined in the X-axis direction within the ZX plane, whereby the light converging efficiency is improved resulting in further enhanced brightness.

Recently, a white light emitting diode (LED) with enhanced performance is increasingly used as a point light source in a spread illuminating apparatus for the purpose of downsizing and lowering power consumption. However, while a line light source emits light with comparatively uniform brightness along its length direction, a plurality of point light sources, which are disposed in a line and parallel to a light entrance surface of a light conductive plate, have respective different brightness distributions with their peaks positioned at the front direction, which causes light outgoing from the apparatus to involve brightness variation unless a uniformizing means is provided. For example, in the spread illuminating apparatus 100 of FIG. 12, if a plurality of point light sources, in place of the line light source 102, are disposed parallel to the light entrance surface 101c of the light conductive plate 101, when light exits out from the light emit surface 101a, the brightness distribution of the outgoing light has its non-uniformity diminished to some degree with respect to the Y-axis direction by means of the prisms formed on the light emit surface 101a, but each point light source normally has emission lines at its both sides in a symmetrical manner thus failing to lead to resolving the brightness variation problem. Especially, when the light reflecting surface 101b is provided with the regular reflecting means described above, the non-uniformity of the brightness distribution of light emitted from the light source is materially reflected thus making the aforementioned problem further noticeable.

To address the problem, the present inventor proposed previously in Japanese Patent Application No. 2002-368805 a spread illuminating apparatus which incorporates a light diffusing means. According to the first embodiment of the aforementioned Japanese Patent Application No. 2002-368805, the light diffusing means disclosed therein comprises a plurality of prisms of various kinds extending in the direction orthogonal to a light entrance surface of a light conductive plate. The prisms include circular arcs in cross-section taken along a line perpendicular to the extension direction, and the maximum tangential angles of respective circular arcs with respect to a principal virtual plane are different from one another. By the light diffusing means thus structured, light traveling in the light conductive plate is caused to be diffused in the direction parallel to the light entrance surface, which enables a spread illuminating apparatus with point light sources to brightly and uniformly illuminate an object.

However, the prisms, which constitute the light diffusing means of the light conductive plate in the spread illuminating apparatus disclosed in the aforementioned Japanese Patent Application No. 2002-368805, may have their respective heights differing from one another, and therefore a prism sheet to be disposed on the light conductive plate is supported only partly by some of the prisms of the light diffusing means that have relatively large heights, rather than entirely by all of the prisms. Consequently, when the illuminating apparatus is subjected to vibration or change of ambient temperature, the contact portions of both the light conductive plate and the prism sheet may have scratches, and the scratches are viewed as emission lines (defects) thus degrading the display quality on the object illuminated.

SUMMARY OF THE INVENTION

The present invention has been made in light of the above problem, and it is an object of the present invention to provide a side light type spread illuminating apparatus with a light conductive plate which incorporates a light diffusing means while preventing scratches.

In order to achieve the object described above, according to one aspect of the present invention, in a spread illuminating apparatus comprising: a light conductive plate having a light exit surface provided with a plurality of prisms which define one extension direction; at least one point light source disposed at a side surface of the light conductive plate; and a prism sheet which has a prism surface provided with a plurality of prisms defining one extension direction, and which is disposed on the light conductive plate such that the prism surface faces the light exit surface of the light conductive plate, and that the extension direction of the prisms of the prism sheet is oriented substantially orthogonal to the extension direction of the prisms of the light conductive plate, the plurality of prisms of the light conductive plate have respective configurations different from one another in cross section taken along a line orthogonal to the extension direction, and respective ridges of the plurality of prisms are located on a common virtual plane. Thus, the prisms of the light conductive plate have the same height, and therefore the prisms of the prism sheet disposed on the light conductive plate are supported evenly by all of the prisms of the light conductive plate, which results in that the load of the prism sheet gives reduced pressure to each of the prisms, and also that the prism sheet sits stably on the light conductive plate, whereby the light conductive plate is better prevented from getting scratched.

In the one aspect of the present invention, the extension direction of the prisms of the light conductive plate may be substantially orthogonal to the side surface of the light conductive plate, at which the at least one point light source is disposed. Consequently, light exiting out from the light exit surface of the light conductive plate is diffused in the direction parallel to the side surface of the light conductive plate thereby reducing the non-uniformity of brightness distribution of the light.

In the one aspect of the present invention, the prisms of the light conductive plate may be arrayed such that distances each defined between apexes of adjacent two of the prisms differ irregularly from one another. Consequently, the non-uniformity of the light brightness distribution is further reduced, and Moire fringes resulting from interference with the pixel period of a liquid crystal panel can be better prevented from occurring.

In the one aspect of the present invention, the prisms of the light conductive plate may have respective circular arc configurations with a common curvature in cross section taken the line orthogonal to the extension direction thereof, and two tangential angles at respective butting ends of adjacent two of the prisms of the light conductive plate may be equal to each other. Consequently, a molding die for forming the light conductive plate can be produced by using only one kind cutting tool and setting the cutting depth, only requiring control of transfer distance. This contributes to decreasing the cost of the molding die.

In the one aspect of the present invention, overall tangential angles at respective ends of the prisms of the light conductive plate may be arranged to vary irregularly within a range of 40 to 70 degrees.

In the one aspect of the present invention, the prisms of the light conductive plate may have respective circular arc configurations with a common curvature in cross section taken the line orthogonal to the extension direction thereof, and the prisms of the light conductive plate may be arrayed such that distances each defined between apexes of adjacent two of the prisms of the light conductive plate differ irregularly from one another within a range of 10 to 200 μm.

In the one aspect of the present invention, the prisms of the light conductive plate may have their surfaces roughened with micro ridges and grooves extending in one direction parallel to the extension direction of the prisms of the light conductive plate. Consequently, the non-uniformity of the light brightness distribution can be markedly reduced.

In the one aspect of the present invention, the roughened surfaces of the prisms of the light conductive plate may have an average surface roughness of 0.1 to 1.0 μm.

DETAILED DESCRIPTION OF THE PREFERRED EMBODIMENTS

The present invention will hereinafter be described with reference to the accompanying drawings.

Figure 1:
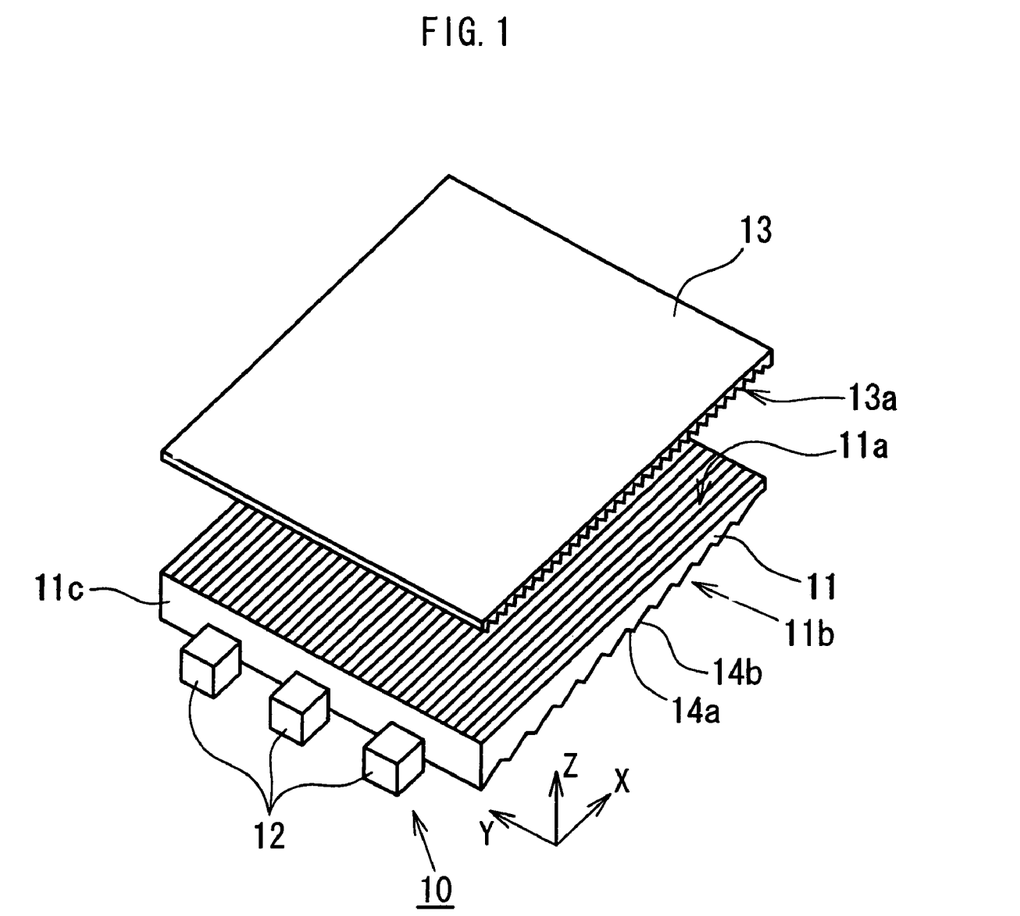
FIG. 1 is an exploded perspective view of a main portion of a spread illuminating apparatus according to a first embodiment of the present invention.

A first embodiment will hereinafter be described with reference to FIGS. 1 to 4B. Referring to FIG. 1, a spread illuminating apparatus 10 comprises a light conductive plate 11, a plurality (three in the figure) of point light sources 12, and a prism sheet 13. The point light sources 12 are white LED's, and the light conductive plate 11 is formed of a transparent resin material, such as methacrylate resin, polycarbonate resin, polystyrene resin, polyolefin resin, amorphous polyolefin resin, polyester resin, transparent fluorocarbon resin, and epoxy resin. The prism sheet 13 is composed of, for example, a PET film based material, and defines a prism surface 13a provided with a plurality of prisms which are formed of methacrylate resin, polycarbonate resin, or the like, have a triangular cross section, and which extend in one same direction.

In the spread illuminating apparatus 10, the point light sources 12 are disposed parallel to a light entrance surface 11c of the light conductive plate 11, and the prism sheet 13 is placed on one major surface (light exit surface) 11a of the light conductive plate 11 with the prism surface 13a facing the light exit surface 11a. The light exit surface 11a of the light conductive plate 11 is provided with a plurality of prisms extending in the direction orthogonal to the light entrance surface 11c, and the prism sheet 13 is disposed with the extension direction of its prisms oriented perpendicular to the extension direction of the plurality of prisms formed at the light exit surface 11a of the light conductive plate 11.

The prisms at the light exit surface 11a are schematically illustrated as a group of straight lines in FIG. 1 and will be detailed later.

The other major surface (light reflection surface) 11b of the light conductive plate 11 is provided with a regular reflecting means comprising a plurality of prisms, which are each composed of inclined surfaces 14a and 14b, extend in the direction parallel to the light entrance surface 11c, and which are arrayed in the direction orthogonal to the light entrance surface 11c. The areas and inclination angles of the inclined surfaces 14a and 14b and the intervals of the prism array are appropriately determined in consideration of the uniformity of brightness distribution depending on the distance from the light entrance surface 11c. In this connection, the light conductive plate 11 does not have to use the regular reflecting means as shown in FIG. 1 but may alternatively use a diffuse reflecting means with a dot pattern composed of a plurality of dots. Also, the light conductive plate 11 in FIG. 1 is shaped into wedge configuration with its thickness decreasing from the light entrance surface 11c toward the other surface opposite thereto, but may alternatively be a simple plate with a constant thickness all the way.

The prisms formed on the light exit surface 11a of the light conductive plate 11 will be discussed. In the following discussion, a plane defined as a reference surface for the prisms is referred to as a "principal virtual plane" of a light conductive plate. Also, a direction orthogonal to the light entrance surface 11c is referred to as an X-axis direction, a direction normal to the principal virtual plane is referred to as a Z-axis direction, and a direction orthogonal to both the X-axis and Z-axis directions is referred to as a Y-axis direction. And, planes defined by the coordinate axes (X, Y, Z) shown in FIG. 1 are referred to as an XY plane, a YZ plane, and an XZ plane, which will also apply to any planes oriented parallel thereto. Further, the peak point of each prism in the Z-axis direction is referred to as an "apex", and a straight line formed by continuously connecting the apexes in the X-axis direction is referred to as a "ridge".

Figure 2A:
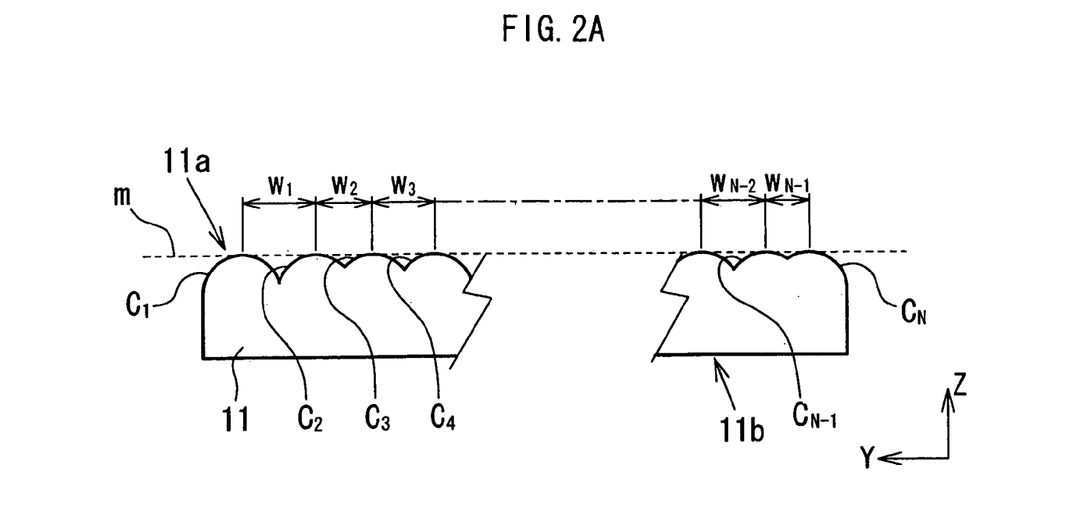
FIG. 2A is a cross-sectional view of a light conductive plate of the spread illuminating apparatus of FIG. 1.
Figure 2B:
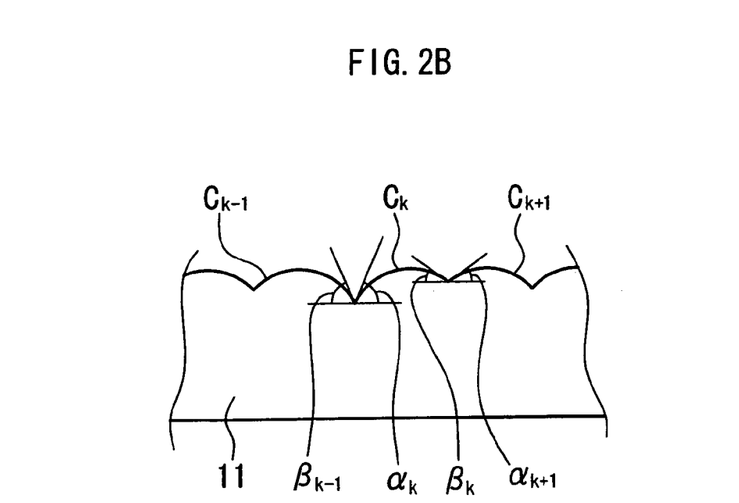
FIG. 2B is an enlarged view of a portion of the cross-section shown in FIG. 2A.

FIG. 2A is a cross-sectional view (partly omitted) of the light conductive plate 11 taken along a line parallel to the light entrance surface 11c (the section is referred to as YZ section), and FIG. 2B is an enlarged view of a portion of the cross section shown in FIG. 2A. Referring to FIG. 2A, a plurality of circular prisms $C_1$ to $C_N$ ($N$ is a predetermined positive integer) are formed so as to have a circular arc with an identical curvature in the YZ section. Apexes of the circular prisms $C_1$ to $C_N$ are aligned to a virtual straight line shown by a dashed line m, and any virtual straight line shifted in the X-axis direction is included in one virtual plane. In other words, the circular prisms $C_1$ to $C_N$ are formed with their respective ridges located on a common virtual plane. Accordingly, in the spread illuminating apparatus 10, the prism sheet 13 is disposed on the light exit surface 11a of the light conductive plate 11 in such a manner that each of the prisms of the prism sheet 13 extending in the Y-axis direction is supported entirely by all of the circular prisms $C_1$ to $C_N$.

In the present embodiment described above, the virtual plane, on which the ridges of the circular prisms $C_1$ to $C_N$ are located, is oriented parallel to the principal plane which is a reference plane for the height of each of the circular prisms $C_1$ to $C_N$, that is to say, the circular prisms $C_1$ to $C_N$ define respective cylindrical surfaces, and all have one same height (dimension in the Z-axis direction) that keeps constant in the X-axis direction, but the present invention is not limited thereto and the virtual plane does not have to be oriented parallel to the principal virtual plane.

Respective distances between the apexes of adjacent two of the circular prisms $C_1$ to $C_N$ are defined as distances $W_1$ to $W_{N-1}$ between the ridges thereof, and are irregularly arranged. Each distance $W_k$ ($_1 \leq _k \leq _{N-1}$) is appropriately set in consideration of brightness distribution uniformity, and workability in die machining to be described later, preferably to fall between 10 and 200 μm. Also, referring to FIG. 2B, if an inferior angle formed between the principal virtual plane and a tangent to the circular arc of each of the circular prisms $C_1$ to $C_N$ is defined as a tangential angle, two tangential angles $\alpha_k$ and $\beta_k$ of the circular arc of one circular prism Ck ($_1 \leq _k \leq _N$) at its joining ends with both adjacent circular prisms $C_{k-1}$ and $C_{k+1}$ are typically different from each other while two adjacent tangential angles (for example, $\beta_k$ and $\alpha_{k+1}$) are equal to each other. Thus, the plurality of circular prisms, which define respective tangential angles different from one another, and each of which has two different tangential angles $\alpha_k$ and $\beta_k$ ($\alpha_1$ and $\beta_N$ are tangential angles at the extreme ends of the circular prisms arrayed) at its both circular arc ends, are arrayed at irregular intervals on the light exit surface 11a of the light conductive plate 11. Each of the tangential angles $\alpha_k$ and $\beta_k$ ($_1 \leq _k \leq _N$) is appropriately set in consideration of brightness distribution uniformity, and workability in die machining to be described later, preferably to fall between 40 and 70 degrees.

In the spread illuminating apparatus 10 provided with the light conductive plate 11 described above, light emitted from each of the point light sources 12 is introduced into the light conductive plate 11 from the light entrance surface 11c, reflected at the light exit surface 11a and the light reflection surface 11b while traveling in the light conductive plate 11, exits out light conductive plate 11 when impinging on the light exit surface 11a at an angle smaller than a critical angle, and illuminates an object, for example, an LCD apparatus. After the light exits out the light conductive plate 11, the emission direction of the light in the XZ plane is corrected with respect to the YZ plane by means of the prisms of the prism sheet 13 extending in the Y-axis direction, thereby increasing the brightness in the Z-axis direction neighbor, that is, front brightness.

Further, since the circular prisms $C_1$ to $C_N$ are arrayed at irregular intervals on the light exit surface 11a of the light conductive plate 11 with respect to the Y-axis direction so that the surfaces of the circular prisms $C_1$ to $C_N$ make various inclinations relative to the principal virtual plane, the emission direction of the light exiting out from the light exit surface 11a of the light conductive plate 11 is diffused effectively in the Y-axis direction, thereby reducing the non-uniformity of brightness distribution in the Y-axis direction. Also, since the ridges of the circular prisms $C_1$ to $C_N$ are located at a common virtual plane, the prism sheet 13 is supported evenly by all of the circular prisms $C_1$ to $C_N$ so as to stably sit on the light conductive plate 11.

Figure 3:
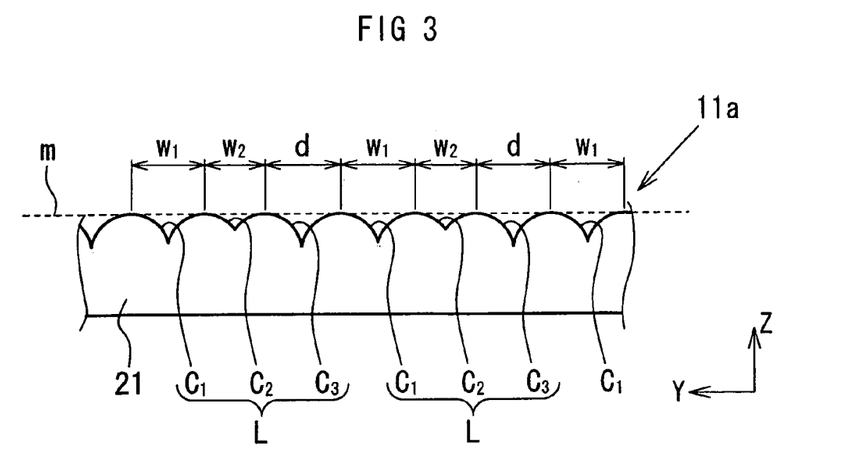
FIG. 3 is a cross-sectional view of a light conductive plate with a modification of the first embodiment of the present invention.

In the light conductive plate 11 shown in FIG. 2A, the distances $W_1$ to $W_{N-1}$ between the apexes of the circular prisms $C_1$ to $C_N$ are arranged irregularly. Referring now to FIG. 3 showing a modification of the first embodiment described above, a light conductive plate 21 shown in the YZ section has a plurality of circular prisms divided into a plurality of units L repeatedly arrayed, each of which is composed of a plurality (three in the figure) of different circular prisms $C_1$, $C_2$ and $C_3$ defining different distances $W_1$ and $W_2$ between their respective apexes. A dimension between the apexes of two abutting prisms of two adjacent units L is defined as a distance d, and respective distances d may be equal to one another or may alternatively differ from one another in a regular or irregular manner. The number of circular prisms constituting the unit L, and the distance between the apexes of the prisms are appropriately set in consideration of brightness distribution uniformity, and workability in die machining to be described later.

Figure 4A:
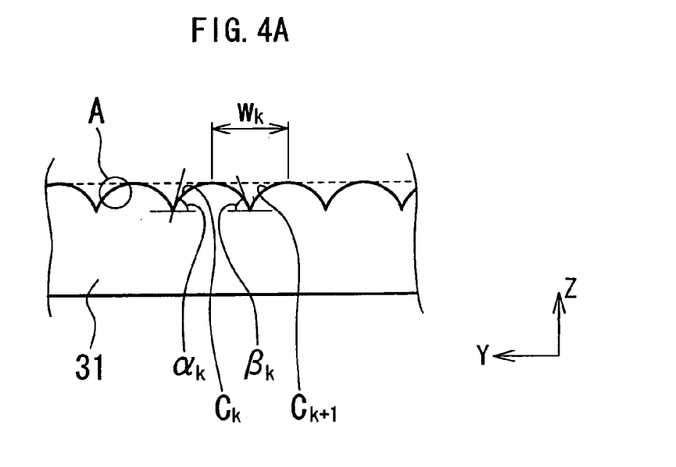
FIG. 4A is a cross-sectional view of a light conductive plate with another modification of the first embodiment of the present invention.
Figure 4B:
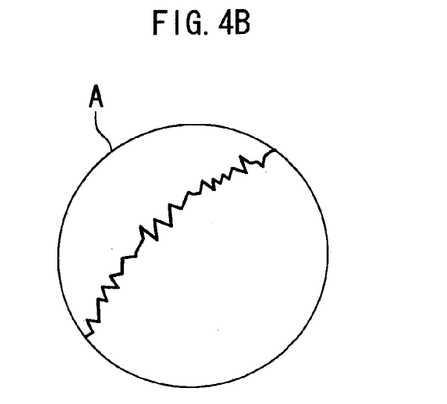
FIG. 4B is an enlarged view of a portion of the cross section shown in FIG. 4A.

Referring to FIGS. 4A and 4B showing another modification of the first embodiment, a light conductive plate 31 has, at its light emit surface, a plurality of circular prisms $C_k$ ($_1 \leq _k \leq _N$) which have an identical cross section with one another, and each of which has its surface roughened by various micro ridges and grooves extending in the X-axis direction (refer to FIG. 4B). With the roughened surfaces of the prisms, even if all of distances $W_k$ and tangential angles ($\alpha_k$, $\beta_k$) about the circular prisms $C_k$ are identical with one another, each prism surface has a plurality of micro prisms different from one another so that micro surfaces differently inclined relative to the principal virtual plane are irregularly arrayed in the Y-axis direction, whereby the emission direction of the light exiting out from the light exit surface of the light conductive plate 31 is diffused effectively in the Y-axis direction so as to reduce the non-uniformity of brightness distribution in the Y-axis direction. The average surface roughness is preferably set to range from 0.1 to 1.0 μm in terms of a center line average roughness Ra defined by JIS B 0601-1982. The distance $W_k$ and the tangential angles ($\alpha_k$, $\beta_k$) about the circular prism $C_k$ are appropriately set in consideration of brightness distribution uniformity, and workability in die machining to be described later. This structure of roughened prism surfaces may be preferably combined with the light conductive plates 11 and 21 shown in FIGS. 2A and 2B, and FIG. 3, respectively, which will demonstrate an outstanding diffusion effect.

A second embodiment of the present invention will be described with reference to FIGS. 5A to 7B. A spread illuminating apparatus according to the second embodiment includes the same components as illustrated in FIG. 1 except a light conductive plate, and therefore an illustration thereof is omitted. In explaining the second embodiment, any component parts corresponding to those in FIG. 1 are denoted by the same reference numerals except the light conductive plate and its relevant portions.

Figure 5A:
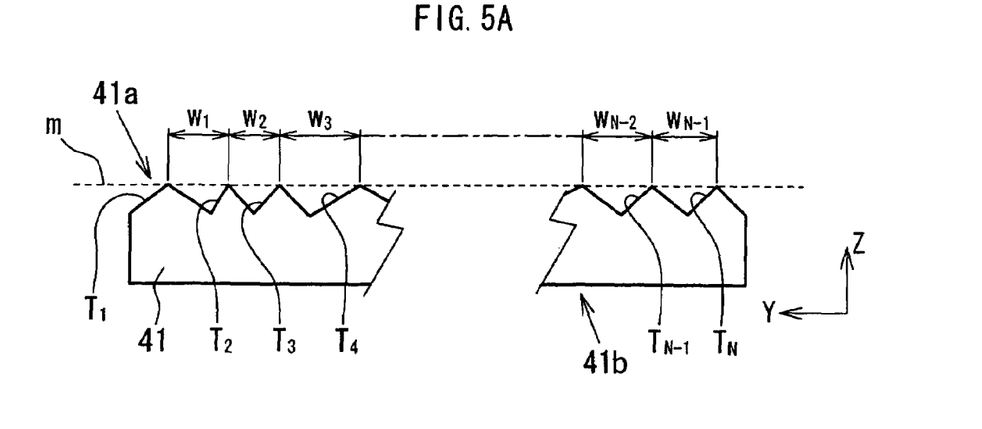
FIG. 5A is a cross-sectional view of a light conductive plate according to a second embodiment of the present invention.
Figure 5B:
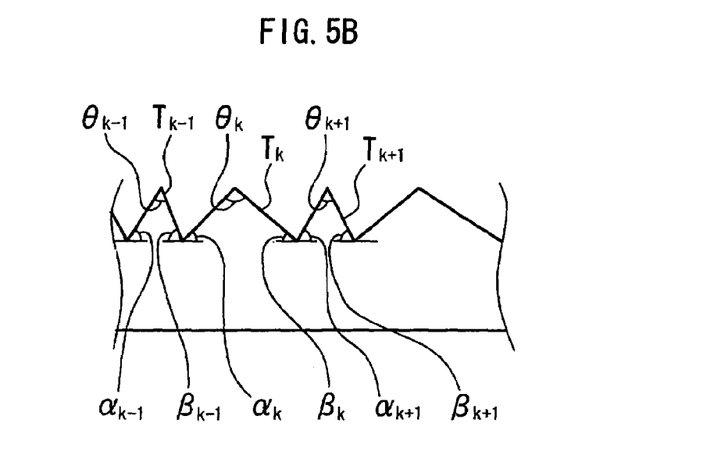
FIG. 5B is an enlarged view of a portion of the cross section shown in FIG. 5A.

FIG. 5A is a cross-sectional view (partly omitted) of a light conductive plate 41 taken along a line parallel to a light entrance surface 41c thereof (YZ section), and FIG. 5B is an enlarged view of a portion of the cross section shown in FIG. 5A. Referring to FIG. 5A, the light conductive plate 41 has, at a light exit surface 41a thereof, a plurality of triangular prisms $T_1$ to $T_N$ ($_N$ is a predetermined positive integer) which have a isosceles triangular shape with respective different apex angles $\theta_1$ to $\theta_N$ in the YZ section, and which extend in the X-axis direction and are arrayed in a random sequence with respect to the Y-axis direction. Apexes of the triangular prisms $T_1$ to $T_N$ are aligned to a virtual straight line shown by a dashed line m, and any virtual straight line shifted in the X-axis direction is included in one virtual plane. In other words, the triangular prisms $T_1$ to $T_N$ are formed with their respective ridges located on a common virtual plane. Accordingly, in the spread illuminating apparatus 10, the prism sheet 13 is disposed on the light exit surface 41a of the light conductive plate 41 in such a manner that each of the prisms of the prism sheet 13 extending in the Y-axis direction is supported by all of the triangular prisms $T_1$ to $T_N$.

In the present embodiment described above, the virtual plane, on which the ridges of the triangular prisms $T_1$ to $T_N$ are located, is oriented parallel to the principal plane which is a reference plane for the height of each of the triangular prisms $T_1$ to $T_N$, that is to say, the triangular prisms $T_1$ to $T_N$ constitute respective triangular column, and all have one same height (dimension in the Z-axis direction) that keeps constant in the X-axis direction, but the present invention is not limited thereto and the virtual plane does not have to be oriented parallel to the principal virtual plane.

Respective distances between the apexes of adjacent two of the triangular prisms $T_1$ to $T_N$ are defined as distances $W_1$ to $W_{N-1}$ between the ridges thereof, and are irregularly arranged. Each distance $W_k$ ($_1 \leq _k \leq _{N-1}$) is appropriately set in consideration of brightness distribution uniformity, and workability in die machining to be described later, preferably to fall between 10 and 200 µm. And, the apex angle $\theta_k$ ($_1 \leq _k \leq _N$) ranges from 50 to 160 degrees, preferably from 130 to 160 degrees. The triangular prisms $T_1$ to $T_N$ are formed to have an isosceles triangular cross section in the embodiment described above but do not have to be formed so, and may alternatively be formed in a triangle with its two inclined sides making respective different angles $\alpha_k$ and $\beta_k$ with respect to the principal virtual plane.

In the spread illuminating apparatus 10 provided with the light conductive plate 41 described above, light emitted from each of the point light sources 12 is introduced into the light conductive plate 41 from the light entrance surface 41c, reflected at the light exit surface 41a and the light reflection surface 41b while traveling in the light conductive plate 41, exits out light conductive plate 41 when impinging on the light exit surface 41a at an angle smaller than a critical angle, and illuminates an object, for example, an LCD apparatus. After the light exits out the light conductive plate 41, the emission direction of the light in the XZ plane is corrected with respect to the YZ plane by means of the prisms of the prism sheet 13 extending in the Y-axis direction, thereby increasing the brightness in the Z-axis direction neighbor, that is, front brightness.

Further, since the triangular prisms $T_1$ to $T_N$, which are shaped in isosceles triangle with respective different apex angles, are arrayed on the light exit surface 41a of the light conductive plate 41 in a random sequence with respect to the Y-axis direction so that a plurality of micro inclined surfaces with various inclinations relative to the principal virtual plane are provided irregularly in the Y-axis direction, the emission direction of the light exiting out from the light exit surface 41a of the light conductive plate 41 is diffused effectively in the Y-axis direction, thereby reducing the non-uniformity of brightness distribution in the Y-axis direction. Also, since the ridges of the triangular prisms $T_1$ to $T_N$ are located at a common virtual plane, the prism sheet 13 is supported evenly by all the triangular prisms $T_1$ to $T_N$ so as to stably sit on the light conductive plate 41.

Figure 6:
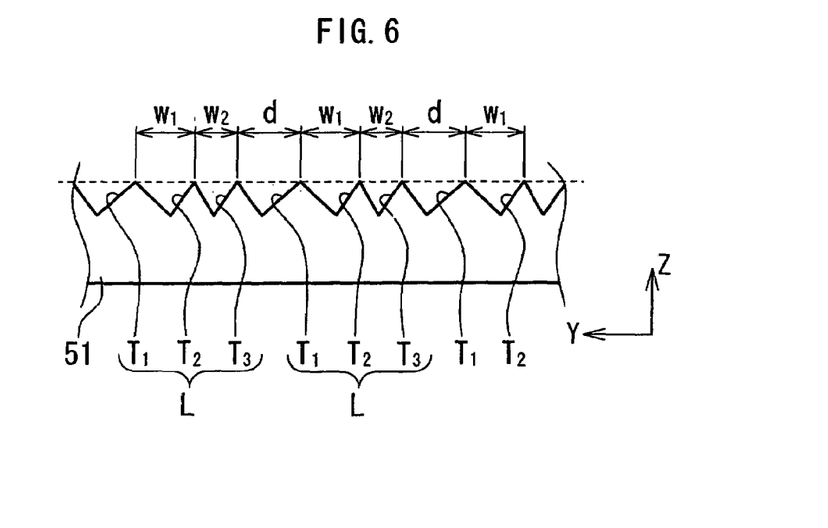
FIG. 6 is a cross-sectional view of a light conductive plate with a modification of the second embodiment of the present invention.

In the light conductive plate 41 shown in FIG. 5A, the distances $W_1$ to $W_{N-1}$ between the apexes of the triangular prisms $T_1$ to $T_N$ are arranged irregularly. Referring now to FIG. 6 showing a modification of the second embodiment described above, a light conductive plate 51 shown in the YZ section has a plurality of triangular prisms divided into a plurality of units L repeatedly arrayed, each of which is composed of a plurality (three in the figure) of different triangular prisms $T_1$, $T_2$ and $T_3$ defining different distances $W_1$ and $W_2$ between their respective apexes. A dimension between the apexes of two abutting prisms of two adjacent units L is defined as a distance d, and respective distances d may be equal to one another or may alternatively differ from one another in a regular or irregular manner. The number of triangular prisms constituting the unit L, and the distance between the apexes of the prisms are appropriately set in consideration of brightness distribution uniformity, and workability in die machining to be described later.

Figure 7A:
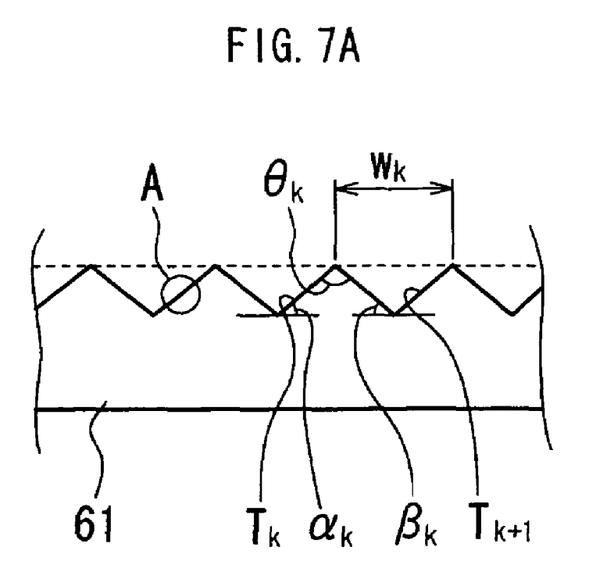
FIG. 7A is a cross-sectional view of a light conductive plate with another modification of the second embodiment of the present invention.
Figure 7B:
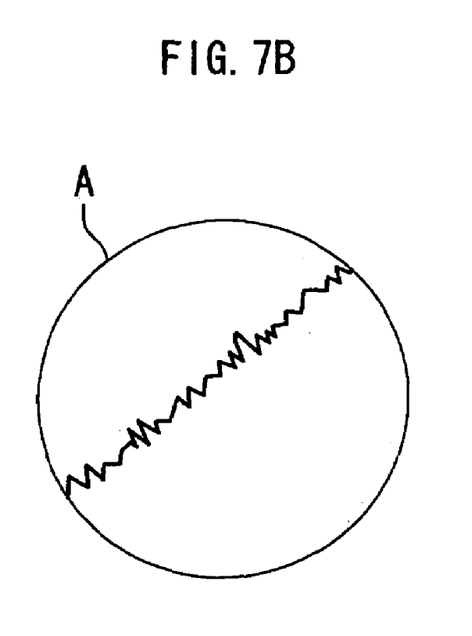
FIG. 7B is an enlarged view of a portion of the cross section shown in FIG. 7A.

Referring to FIGS. 7A and 7B showing another modification of the second embodiment, a light conductive plate 61 has, at its light emit surface, a plurality of triangular prisms $T_k$ ($_1 \leq _k \leq _N$) which have an identical cross section with one another, and each of which has its inclined surfaces roughened by various micro ridges and grooves extending in the X-axis direction (refer to FIG. 7B). With the roughened surfaces of the prisms, even if all of distances $W_k$ and respective angles ($\theta_k$, $\alpha_k$, $\beta_k$) about the triangular prisms $C_k$ are identical with one another, each prism surface has a plurality of micro prisms different from one another so that micro surfaces differently inclined relative to the principal virtual plane are irregularly arrayed in the Y-axis direction, whereby the emission direction of the light exiting out from the light exit surface of the light conductive plate 61 is diffused effectively in the Y-axis direction so as to reduce the non-uniformity of brightness distribution in the Y-axis direction. The average surface roughness is preferably set to range from 0.1 to 1.0 µm in terms of a center line average roughness Ra defined by JIS B 0601-1982. The distance $W_k$ and the tangential angles ($\theta_k$, $\alpha_k$, $\beta_k$) about the triangular prism $T_k$ are appropriately set in consideration of brightness distribution uniformity, and workability in die machining to be described later. This structure of roughened prism surfaces may be preferably combined with the light conductive plates 41 and 51 shown in FIGS. 5A and 5B, and FIG. 6, respectively, which will demonstrate an outstanding diffusion effect.

A third embodiment of the present invention will be described with reference to FIGS. 8A to 10B. A spread illuminating apparatus according to the third embodiment includes the same components as illustrated in FIG. 1 except a light conductive plate, and therefore an illustration thereof is omitted. In explaining the third embodiment, any component parts corresponding to those in FIG. 1 are denoted by the same reference numerals except the light conductive plate and its relevant portions.

Figure 8A:
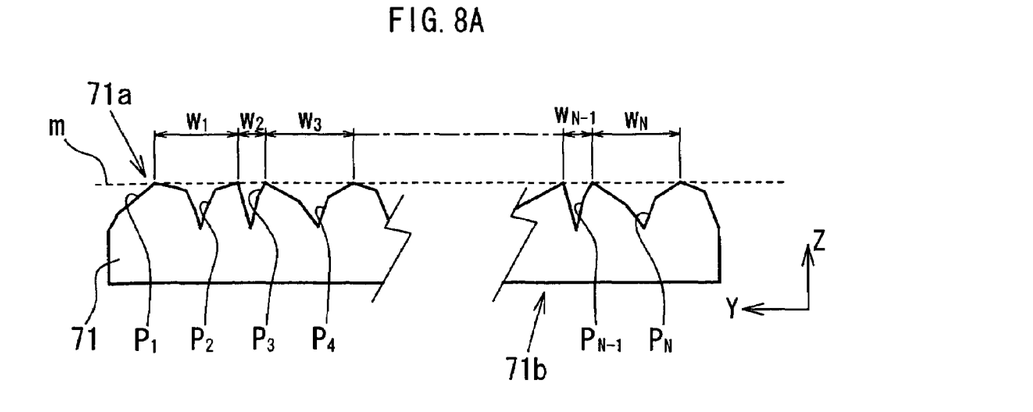
FIG. 8A is a cross-sectional view of a light conductive plate according to a third embodiment of the present invention.
Figure 8B:
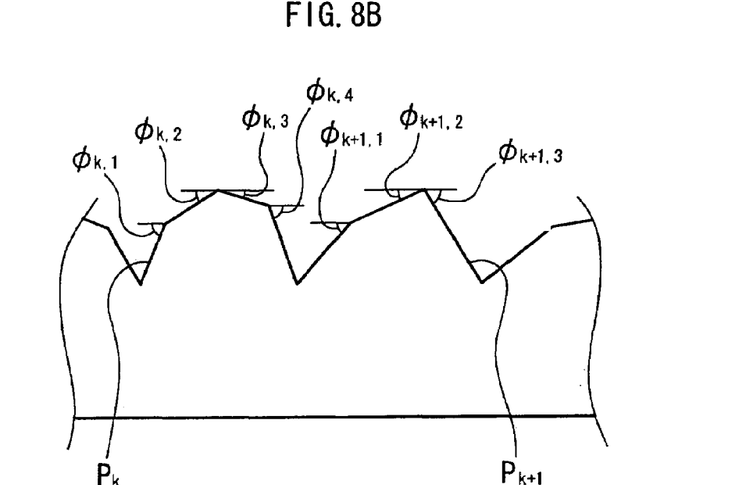
FIG. 8B is an enlarged view of a portion of the cross section shown in FIG. 8A.

FIG. 8A is a cross-sectional view (partly omitted) of a light conductive plate 71 taken along a line parallel to a light entrance surface 71c thereof (YZ section), and FIG. 8B is an enlarged view of a portion of the cross section shown in FIG. 5A. Referring to FIG. 8A, the light conductive plate 71 has, at a light exit surface 71a thereof, a plurality of polygonal prisms $P_1$ to $P_N$ ($_N$ is a predetermined positive integer) which have respective different numbers n of sides, have respective different shapes in the YZ section, and which extend in the X-axis direction and are arrayed in a random sequence with respect to the Y-axis direction. Apexes of the polygonal prisms $P_1$ to $P_N$ are aligned to a virtual straight line shown by a dashed line m, and any virtual straight line shifted in the X-axis direction is included in one virtual plane. In other words, the polygonal prisms $P_1$ to $P_N$ are formed with their respective ridges located on a common virtual plane. Accordingly, in the spread illuminating apparatus 10, the prism sheet 13 is disposed on the light exit surface 71a of the light conductive plate 71 in such a manner that each of the prisms of the prism sheet 13 extending in the Y-axis direction is supported by all of the polygonal prisms $P_1$ to $P_N$.

In the present embodiment described above, the virtual plane, on which the ridges of the polygonal prisms $P_1$ to $P_N$ are located, is oriented parallel to the principal plane which is a reference plane for the height of each of the polygonal prisms $P_1$ to $P_N$, that is to say, the triangular prisms $T_1$ to $T_N$ constitute respective triangular column, and all have one same height (dimension in the Z-axis direction) that keeps constant in the X-axis direction, but the present invention is not limited thereto and the virtual plane does not have to be oriented parallel to the principal virtual plane.

Respective distances between the apexes of adjacent two of the polygonal prisms $P_1$ to $P_N$ are defined as distances $W_1$ to $W_{N-1}$ between the ridges thereof, and are irregularly arranged. Each distance $W_k$ ($_1 \leq_k \leq_{N-1}$) is appropriately set in consideration of brightness distribution uniformity, and workability in die machining to be described later, preferably to fall between 10 and 200 µm. And, since the polygonal prisms $P_1$ to $P_N$, which have different numbers of sides and have respective different cross section, each define different angles $\phi_{k,1}$ to $\phi_{k,n}$ made by sides 1 to n (n=4 for $P_k$, n=3 for $P_{k+1}$) with respect to the principal virtual plane as shown in FIG. 8B, the light exit surface 71a of the light conductive plate 71 is provided with an irregular array of a number of declined surfaces with various declination angles.

In the spread illuminating apparatus 10 provided with the light conductive plate 71 described above, light emitted from each of the point light sources 12 is introduced into the light conductive plate 71 from the light entrance surface 71c, reflected at the light exit surface 71a and the light reflection surface 7b while traveling in the light conductive plate 71, exits out light conductive plate 71 when impinging on the light exit surface 71a at an angle smaller than a critical angle, and illuminates an object, for example, an LCD apparatus. After the light exits out the light conductive plate 71, the emission direction of the light in the XZ plane is corrected with respect to the YZ plane by means of the prisms of the prism sheet 13 extending in the Y-axis direction, thereby increasing the brightness in the Z-axis direction neighbor, that is, front brightness.

Further, since the triangular prisms $P_1$ to $P_N$, which have different numbers of sides and have respective different cross section, and which each define different angles made by sides with respect to the principal virtual plane, are arrayed on the light exit surface 41a of the light conductive plate 41 in a random sequence with respect to the Y-axis direction so that a plurality of inclined micro surfaces with various inclinations relative to the principal virtual plane are provided irregularly in the Y-axis direction, the emission direction of the light exiting out from the light exit surface 71a of the light conductive plate 71 is diffused effectively in the Y-axis direction, thereby reducing the non-uniformity of brightness distribution in the Y-axis direction. Also, since the ridges of the polygonal prisms $P_1$ to $P_N$ are located at a common virtual plane, the prism sheet 13 is supported evenly by all of the polygonal prisms $P_1$ to $P_N$ so as to stably sit on the light conductive plate 71.

Figure 9:
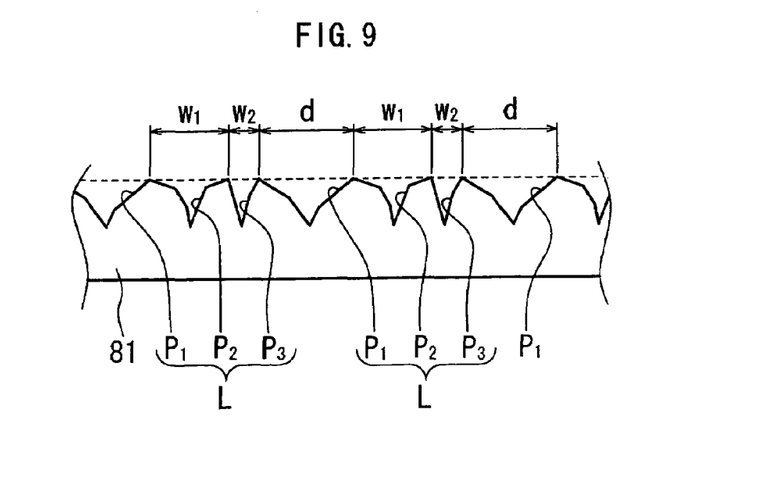
FIG. 9 is a cross-sectional view of a light conductive plate with a modification of the third embodiment of the present invention.

In the light conductive plate 71 shown in FIG. 8A, the distances $W_1$ to $W_{N-1}$ between the apexes of the polygonal prisms $P_1$ to $P_N$ are arranged irregularly. Referring now to FIG. 9 showing a modification of the third embodiment described above, a light conductive plate 81 shown in YZ section has a plurality of polygonal prisms divided into a plurality of units L repeatedly arrayed, each of which is composed of a plurality (three in the figure) of different polygonal prisms $P_1$, $P_2$ and $P_3$ defining different distances $W_1$ and $W_2$ between their respective apexes. A dimension between the apexes of two abutting prisms of two adjacent units L is defined as a distance d, and respective distances d may be equal to one another or may alternatively differ from one another in a regular or irregular manner. The number of polygonal prisms constituting the unit L, and the distance between the apexes of the prisms are appropriately set in consideration of brightness distribution uniformity, and workability in die machining to be described later.

Figure 10A:
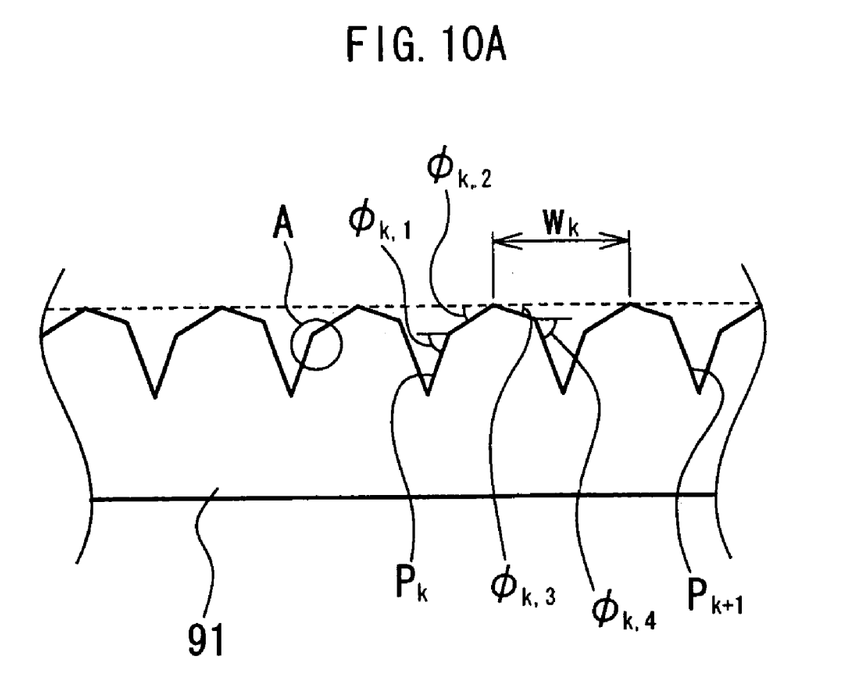
FIG. 10A is a cross-sectional view of a light conductive plate with a modification of the third embodiment of the present invention.
Figure 10B:
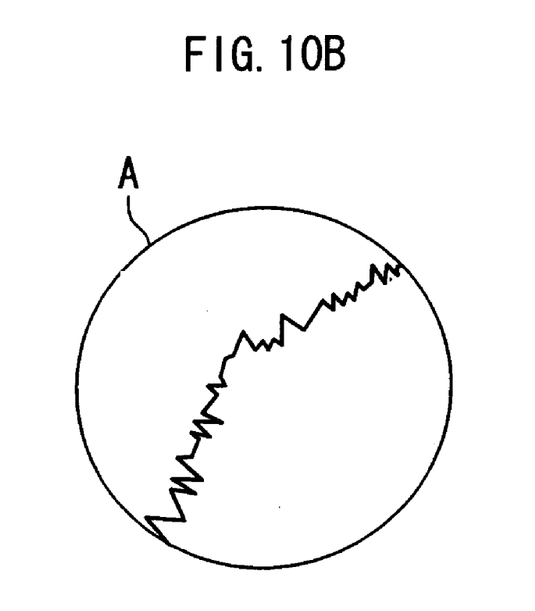
FIG. 10B is an enlarged view of a portion of the cross-section shown in FIG. 10A.

Referring to FIGS. 10A and 10B showing another modification of the third embodiment, a light conductive plate 71 has, at its light emit surface, a plurality of polygonal prisms $P_k$ ($_1 \leq_k \leq_N$) which have an identical cross section with one another, each of which has its inclined surfaces roughened by various micro ridges and grooves extending in the X-axis direction (refer to FIG. 10B). With the roughened surfaces of the prisms, even if all of distances $W_k$ and respective inclination angles ($\theta_k$, $\alpha_k$, $\beta_k$) about the triangular prisms $C_k$ are identical with one another, each prism surface has a plurality of micro prisms different from one another so that micro surfaces differently inclined relative to the principal virtual plane are irregularly arrayed in the Y-axis direction, whereby the emission direction of the light exiting out from the light exit surface of the light conductive plate 61 is diffused effectively in the Y-axis direction so as to reduce the non-uniformity of brightness distribution in the Y-axis direction. The average surface roughness is preferably set to range from 0.1 to 1.0 µm in terms of a center line average roughness Ra defined by JIS B 0601-1982. The distance $W_k$ and the inclination angles ($\phi_{k,1}$, $\phi_{k,2}$, $\phi_{k,3}$ and $\phi_{k,4}$) of the sides constituting the polygonal prism $P_k$ are appropriately set in consideration of brightness distribution uniformity, and workability in die machining to be described later. This structure of roughened prism surfaces may be preferably combined with the light conductive plates 71 and 81 shown in FIGS. 8A and 8B, and FIG. 9, respectively, which will demonstrate an outstanding diffusion effect.

A brief description will be made on a manufacturing method of a light conductive plate for the spread illuminating apparatus according to the present invention. A light conductive plate is usually formed of one of the aforementioned transparent resin materials, preferably, by injection molding, and a molding die is processed such that a portion for forming the prisms is cut by a cutting tool having an edge geometry corresponding to the prism configuration so as to meet the prism surface arrangement discussed above with a constant cutting depth from the reference surface based on the principal virtual plane. For example, in case of the first embodiment described above, the cutting tool has an edge shaped circular with a predetermined curvature. If the cutting tool has a surface adapted to produce a predetermined center line average roughness Ra, the prim surfaces can be provided with micro ridges and grooves extending in one same direction.

In the description of the preferred embodiments of the present invention, the prism sheet is disposed on the light conductive plate with their respective prism extension directions oriented orthogonal to each other, but their respective prism extension directions may alternatively be off the orthogonal arrangement by about 10 degrees or less.

[Inventive Sample]

Figure 11A:
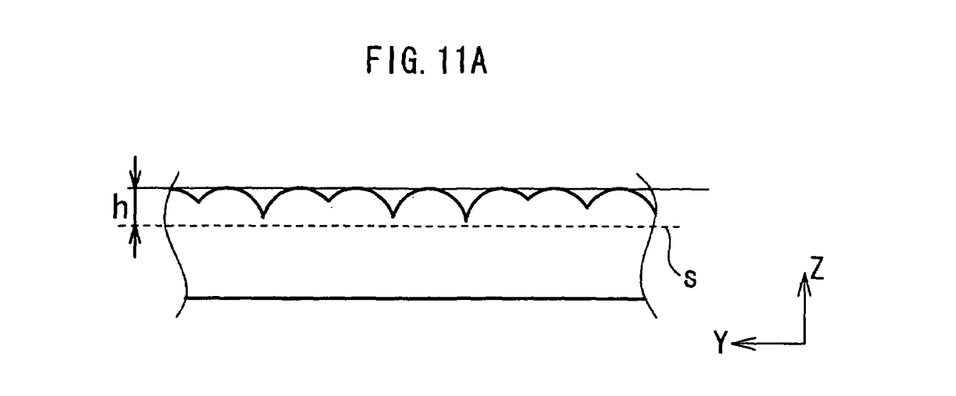
FIG. 11A is a cross-sectional view of one example light conductive plate according to the present invention.

A molding die for forming a light conductive plate was processed by a cutting tool which has an edge configured with a circular arc with a curvature radius of 35 µm such that a plurality of grooves are formed with a cutting depth kept constant at 35 µm from the reference plane and with a feeding distance varied irregularly within a range of 45 to 65 µm. Tangential angles at respective butting ends of two adjacent circular arcs are equal to each other while overall tangential angles vary irregularly so as to range from 40 to 70 degrees. Using the molding die thus processed, a light conductive plate with its YZ section configured as shown in FIG. 11A was manufactured as an inventive sample. As shown in FIG. 11A, the prisms on the inventive sample have an identical height h of 35 µm from the principal virtual plane S. A spread illuminating apparatus was produced such that a prism sheet was placed on a light exit surface of the above-described light conductive plate with their respective prism extension directions oriented orthogonal to each other. Vibration test (amplitude: 1.5 mm; frequency range: 15 to 60 Hz; cycle: 15 minutes; testing time: 1 hour each in the X, Y and Z directions) and heat cycle test (temperature range: −40 to 85 degrees C.; cycle: 1 hour; testing time: 100 hours) were conducted on the spread illuminating apparatus thus produced, and no scratches were found at any parts of the prisms of both the light conductive plate and the prism sheet, including the mutual contact portions thereof. And, it was found that the inventive sample described above shows optical characteristics, such as front brightness and brightness distribution uniformity, equivalent to those of a comparative sample described below.

[Comparative Sample]

Figure 11B:
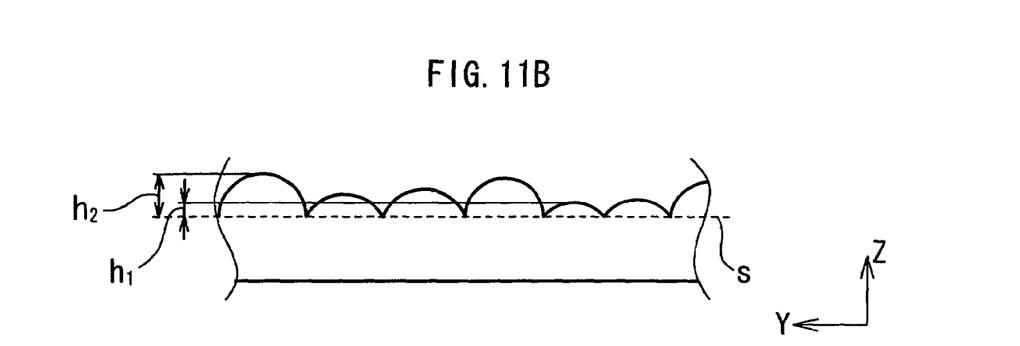
FIG. 11B is a cross-sectional view of a conventional light conductive plate for comparison purpose.

A molding die for forming a light conductive plate was processed by a cutting tool which has an edge configured with a circular arc with a curvature radius of 35 µm such that a plurality of grooves are formed with a cutting depth varied irregularly within a range of 25 to 35 µm from the reference plane and with a feeding distance varied irregularly within a range of 45 to 65 µm. Tangential angles at respective butting ends of adjacent two circular arcs are equal to each other while overall tangential angles vary irregularly so as to range from 40 to 70 degrees. Using the molding die thus processed, a light conductive plate with its YZ section configured as shown in FIG. 11B was manufactured as a comparative sample. As shown in FIG. 11A, the prisms on the comparative sample have respective heights differing irregularly from one another between h1 and h2 (25 to 35 µm) from the principal virtual plane S. Another spread illuminating apparatus was produced such that a prism sheet was placed on a light exit surface of the above-described light conductive plate with their respective prism extension directions oriented orthogonal to each other. Vibration test (amplitude: 1.5 mm; frequency range: 15 to 60 Hz; cycle: 15 minutes; testing time: 1 hour each in the X, Y and Z directions) and heat cycle test (temperature range: −40 to 85 degrees C.; cycle: 1 hour; testing time: 100 hours) were conducted on the spread illuminating apparatus thus produced, and the mutual contact portions of the prisms of both the light conductive plate and the prism sheet were found to be scratched.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A spread illuminating apparatus comprising:
    a light conductive plate having a light exit surface provided with a plurality of prisms which define one extension direction, have respective configurations different from one another in cross section taken along a line orthogonal to the extension direction, and which have their respective ridges located on a common virtual plane;
    at least one point light source disposed at a side surface of the light conductive plate; and
    a prism sheet having a prism surface provided with a plurality of prisms which define one extension direction, the prism sheet being disposed on the light conductive plate such that the prism surface faces the light exit surface of the light conductive plate, and that the extension direction of the prisms of the prism sheet is oriented substantially orthogonal to the extension direction of the prisms of the light conductive plate;
    wherein the prisms of the light conductive plate have respective circular arc configurations with a common curvature in cross section taken the line orthogonal to the extension direction thereof;
    wherein two tangential angles at respective butting ends of adjacent two of the prisms of the light conductive plate are equal to each other; and
    wherein overall tangential angles at respective ends of the prisms of the light conductive plate are arranged to vary irregularly within a range of 40 to 70 degrees.

2. A spread illuminating apparatus according to claim 1, wherein the extension direction of the prisms of the light conductive plate is substantially orthogonal to the side surface of the light conductive plate, at which the at least one point light source is disposed.

3. A spread illuminating apparatus according to claim 2, wherein the prisms of the light conductive plate are arrayed such that distances each defined between apexes of adjacent two of the prisms differ irregularly from one another.

4. A spread illuminating apparatus according to claim 2, wherein the prisms of the light conductive plate have respective circular arc configurations with a common curvature in cross section taken the line orthogonal to the extension direction thereof, and wherein the prisms of the light conductive plate are arrayed such that distances each defined between apexes of adjacent two of the prisms differ irregularly from one another within a range of 10 to 200 µm.

5. A spread illuminating apparatus according to claim 2, wherein the prisms of the light conductive plate have their surfaces roughened with micro ridges and grooves extending in one direction parallel to the extension direction of the prisms of the light conductive plate.

6. A spread illuminating apparatus according to claim 1, wherein the prisms of the light conductive plate are arrayed such that distances each defined between apexes of adjacent two of the prisms differ irregularly from one another.

7. A spread illuminating apparatus according to claim 6, wherein the prisms of the light conductive plate have their surfaces roughened with micro ridges and grooves extending in one direction parallel to the extension direction of the prisms of the light conductive plate.

8. A spread illuminating apparatus according to claim 1, wherein the prisms of the light conductive plate have respective circular arc configurations with a common curvature in cross section taken the line orthogonal to the extension direction thereof, and wherein the prisms of the light conductive plate are arrayed such that distances each defined between apexes of adjacent two of the prisms differ irregularly from one another within a range of 10 to 200 µm.

9. A spread illuminating apparatus according to claim 8, wherein the prisms of the light conductive plate have their surfaces roughened with micro ridges and grooves extending in one direction parallel to the extension direction of the prisms of the light conductive plate.

10. A spread illuminating apparatus according to claim 1, wherein the prisms of the light conductive plate have their surfaces roughened with micro ridges and grooves extending in one direction parallel to the extension direction of the prisms of the light conductive plate.

11. A spread illuminating apparatus according to claim 10, wherein the roughened surfaces of the prisms of the light conductive plate have an average surface roughness of 0.1 to 1.0 µm.

* * * * *